United States Patent
Katayama et al.

(10) Patent No.: US 12,039,399 B2
(45) Date of Patent: Jul. 16, 2024

(54) OPTICAL SYMBOL, INFORMATION PROCESSING DEVICE, AND CODE READING METHOD

(71) Applicants: Hiroshi Katayama, Kanagawa (JP); Mina Tsukahara, Kanagawa (JP)

(72) Inventors: Hiroshi Katayama, Kanagawa (JP); Mina Tsukahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/189,421

(22) Filed: Mar. 24, 2023

(65) Prior Publication Data

US 2023/0342576 A1    Oct. 26, 2023

(30) Foreign Application Priority Data

Apr. 21, 2022  (JP) ................. 2022-070090

(51) Int. Cl.
G06K 7/14      (2006.01)
G06K 19/06    (2006.01)

(52) U.S. Cl.
CPC ..... *G06K 7/1417* (2013.01); *G06K 19/06037* (2013.01)

(58) Field of Classification Search
CPC ................................................... G06K 7/1417
USPC ....................................................... 235/462.1
See application file for complete search history.

(56) References Cited

U.S. PATENT DOCUMENTS

| | | | | |
|---|---|---|---|---|
| 11,042,792 | B2* | 6/2021 | Pic ....................... | G07D 7/2033 |
| 11,620,809 | B2* | 4/2023 | Huang ..................... | G06T 7/74 |
| | | | | 382/200 |
| 2010/0243747 | A1* | 9/2010 | Saito ................ | G06K 19/06028 |
| | | | | 235/494 |
| 2013/0140354 | A1* | 6/2013 | Fan .................. | G06K 19/06037 |
| | | | | 235/494 |
| 2017/0316241 | A1 | 11/2017 | Katayama et al. | |
| 2018/0213125 | A1* | 7/2018 | Takeuchi ............. | G06K 15/105 |
| 2019/0188438 | A1* | 6/2019 | Liu ........................ | G06V 20/80 |
| 2019/0290054 | A1* | 9/2019 | Weber ....................... | A23L 2/52 |
| 2020/0001540 | A1* | 1/2020 | McAlpine ............. | B29C 64/106 |
| 2020/0193113 | A1* | 6/2020 | Momose ............... | H04N 19/167 |
| 2023/0034244 | A1* | 2/2023 | Massicot .......... | G06K 19/06037 |
| 2023/0094590 | A1* | 3/2023 | Okabe ............... | G06K 19/06056 |
| | | | | 235/494 |
| 2023/0342576 | A1* | 10/2023 | Katayama ............. | G06K 7/1417 |
| 2023/0394267 | A1* | 12/2023 | Sagan .............. | G06K 19/06056 |
| 2024/0013603 | A1* | 1/2024 | Glinert ............. | G06K 19/06065 |

FOREIGN PATENT DOCUMENTS

| | | |
|---|---|---|
| JP | 2016-110528 | 6/2016 |
| JP | 2017-199306 | 11/2017 |
| JP | 2018-169670 | 11/2018 |

* cited by examiner

*Primary Examiner* — Allyson N Trail
(74) *Attorney, Agent, or Firm* — IPUSA, PLLC

(57) ABSTRACT

An optical symbol includes a data portion in which a plurality of cells is arranged. Each of the plurality of cells is assigned with a linear gradient according to a value.

10 Claims, 12 Drawing Sheets

| 0 | 1 | 1 | 0 |
|---|---|---|---|
| 2 | 2 | 3 | 2 |
| 3 | 2 | 2 | 3 |

| 0 | 3 | 5 | 2 |
|---|---|---|---|
| 4 | 4 | 1 | 2 |
| 1 | 0 | 2 | 5 |

FIG. 11

| X COORDINATE | Y COORDINATE | IMAGE CAPTURING DEVICE | CODE | UPDATE DATE AND TIME | REMARKS |
|---|---|---|---|---|---|
| 100 | 235 | CAMERA 1 | 00001234567 | 2021/12/24 15:46:59 | ... |
| 568 | 42 | CAMERA 2 | 98743200001 | 2021/12/24 19:12:03 | ... |
| 200 | 300 | CAMERA 1 | 00013570090 | 2021/12/25 09:02:30 | ... |
| ... | ... | ... | ... | ... | ... |

OPTICAL SYMBOL, INFORMATION PROCESSING DEVICE, AND CODE READING METHOD

CROSS-REFERENCE TO RELATED APPLICATIONS

This patent application is based on and claims priority pursuant to 35 U.S.C. § 119(a) to Japanese Patent Application No. 2022-070090, filed on Apr. 21, 2022, in the Japan Patent Office, the entire disclosure of which is hereby incorporated by reference herein.

BACKGROUND

Technical Field

Embodiments of the present disclosure relate to an optical symbol, an information processing device, and a code reading method.

Related Art

A two-dimensional code having information in a vertical direction and a horizontal direction is used. As one type of two-dimensional code, there is a color code representing information by an array of colors.

For example, a comb-shaped pattern color code is known. The comb-shaped pattern color code is a color code having a comb-shaped pattern data structure including a main code in which two color component marks are repeated and a plurality of sub-codes hanging from each of the component marks except for the ones at both ends of the main code.

SUMMARY

According to an embodiment of the present disclosure includes an optical symbol including a data portion in which a plurality of cells is arranged. Each of the plurality of cells is assigned with a linear gradient according to a value.

According to an embodiment of the present disclosure includes an information processing device including circuitry to detect an area having a predetermined shape from a captured image including an optical symbol, extract a characteristic pattern based on a linear gradient included in the area, select the area in which the characteristic pattern matches a predetermined pattern, and identify a code based on the linear gradient included in the area.

According to an embodiment of the present disclosure includes a code reading method including detecting an area having a predetermined shape from a captured image including an optical symbol, extracting a characteristic pattern based on a linear gradient included in the area, selecting the area in which the characteristic pattern matches a predetermined pattern, and identifying a code based on the linear gradient included in the area.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a diagram illustrating an example of a reading result table according to the second embodiment of the present disclosure;

Figure 1:
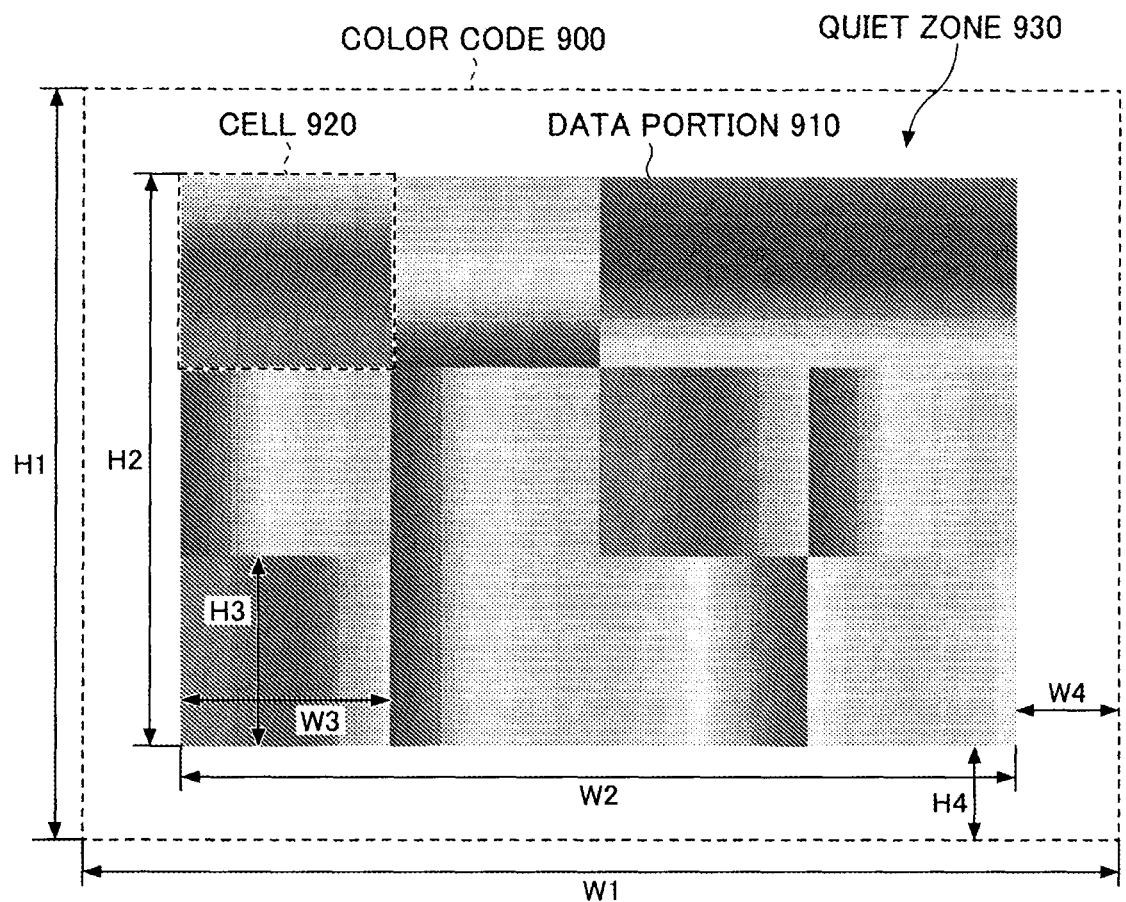
FIG. 1 is a diagram illustrating an example of a color code according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail below, with reference to the drawings. In the drawings, the same elements are denoted by the same reference numerals, and redundant descriptions thereof are omitted in the following description.

Overview

For example, bar codes or two-dimensional codes are widely used in the logistics industry. In addition, a colored two-dimensional code called a color code is used in some cases.

For example, such a two-dimensional code is attached to a product, a component, or a cardboard, which packages the product or the component, and scanned with a handy scanner or a camera for individual identification. The individual identification by the two-dimensional code can be used for various purposes such as inspection in warehousing and delivery work, component selection at an assembly site, and entrance and exit recording.

As an individual identification technology other than the two-dimensional code, a radio frequency identifier (RFID) using radio waves is also used. As compared with the two-dimensional code, the RFID costs more for introduction, has difficulty in specifying an object in a case of recognition failure, and has possibility of being physically damaged due to vibration, for example. For this reason, the two-dimensional code and the RFID are selectively used depending on the application.

In a case of a two-dimensional code according to a related art, an area of a place to which the two-dimensional code is attached is small. Such a two-dimensional code according to a related art has difficulty to be applied to an object that moves or is moved. This is because as the area of the two-dimensional code becomes smaller, the influence of vibration generated when the object moves becomes relatively larger, and accordingly detection omission or erroneous detection may easily occur.

In order to reduce the influence of vibration, increasing areas of cells included in the two-dimensional code is effective. However, when the areas of the cells are increased, the number of cells included in the two-dimensional code decreases, and an amount of information that can be represented by the two-dimensional code decreases. Decreasing the amount of information can cause failure to satisfy the operation requirement. In addition, when the number of cells included in the two-dimensional code decreases, the characteristics of the two-dimensional code decrease. When the characteristics decrease, the detection accuracy of the two-dimensional code decreases.

An embodiment of the present disclosure provides a two-dimensional code that does not reduce the information amount and characteristic even when the number of cells is small, and that is detectable with high accuracy even when the area is small.

First Embodiment

According to a first embodiment of the present disclosure, an optical symbol includes a data portion in which a plurality of cells is arranged. The optical symbol according to the present embodiment is a color code in which a color according to a value is assigned to each cell.

In the color code according to the present embodiment, the color assigned to the cell is expressed by a gradient. The optical symbol according to the present embodiment is described with reference to FIGS. 1 to 3.

Configuration of Color Code FIG. 1 is a diagram illustrating an example of a color code according to the present embodiment.

Shape

As illustrated in FIG. 1, a color code 900 according to the present embodiment includes a data portion 910 and a quiet zone 930.

The quiet zone 930 is an area present around the data portion 910. The quiet zone 930 is provided to create a margin between the color code 900 and another color code 900.

The data portion 910 includes multiple cells 920 that are two-dimensionally arranged. Each of the multiple cells 920 is in contact with an adjacent one or more of the multiple cells 920. In other words, two cells 920 adjacent to each other are connected to each other without a margin.

In the present embodiment, the cell 920 is formed in a square shape. The multiple cells 920 are two-dimensionally connected to each other in a manner that the data portion 910 is formed in a quadrilateral shape (e.g., a rectangle or a square).

However, the shape of the cell 920 or the data portion 910 is merely an example, and any shape may be used as long as the shape does not affect recognition accuracy.

The dimensions of the color code 900, the cell 920, and the quiet zone 930 may be designed depending on the application. For example, a width W1 of the color code 900 may be set to 145 mm (millimeters), and a height H1 may be set to 116 mm. For example, each of a width W3 and a height H3 of the cell 920 may be set to 29 mm.

The number of columns and rows of the cells 920 in the data portion 910 may be set according to an amount of information represented by the color code 900. For example, the number of columns of the cells 920 may be set to four and the number of rows of the cells 920 may be set to three. In this case, a width W2 and a height H2 of the data portion 910 are 116 mm and 87 mm, respectively.

A width W4 and a height H4 of the quiet zone 930 are preferably approximately half of the width W3 and the height H3 of the cell 920. Accordingly, each of the width W4 and height H4 of the quiet zone 930 may set to 14 mm, for example.

Gradient A gradient according to a value is assigned to the cell 920. The gradient is a linear gradient in which the color changes along a straight line. In the gradient in the present embodiment, a direction of the straight line in which the color changes is either the vertical direction or the horizontal direction. However, the direction of the straight line is an example, and may be any direction within a range that does not affect the recognition accuracy.

Figure 2:
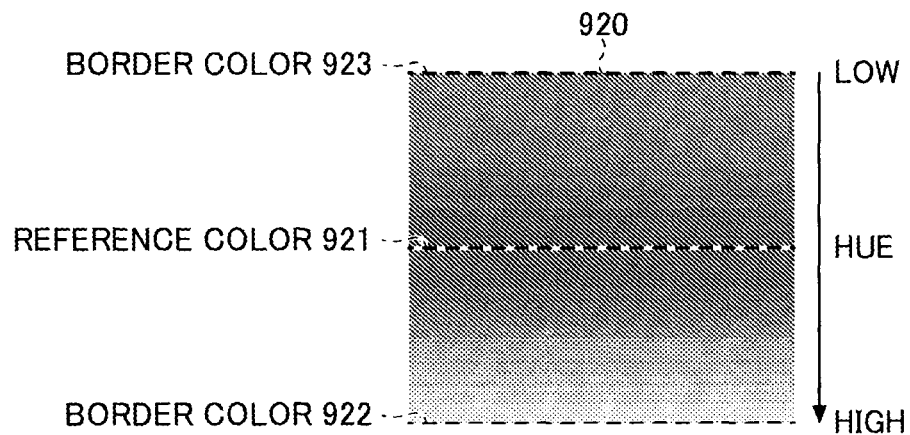
FIG. 2 is a diagram illustrating an example of gradient according to the first embodiment of the present disclosure.

FIG. 2 is a diagram illustrating an example of gradient according to the present embodiment. As illustrated in FIG. 2, the gradient assigned to the cell 920 is represented by increasing a degree of hue in a predetermined direction.

Specifically, a reference color 921 corresponding to the value is set to the center of the cell 920. A first border color 922 having a hue higher than that of the reference color 921 is set to one side located on a predetermined direction from the center. In addition, a second border color 923 having a hue lower than that of the reference color 921 is set to another side located on another direction opposite to the predetermined direction with respect to the center. The gradient is represented by gradually increasing the degree of hue from the second border color 923 toward the first border color 922.

The reference color 921 is selected from a plurality of reference colors having different degrees of hue at equal intervals. For example, in a case of setting six types of reference colors, the six types of reference colors are set at intervals of 60 degrees in the hue circle.

A border color is set so that a gradient represented by a certain reference color does not overlap with a gradient represented by another reference color. For example, when six types of reference colors are set, a first border color of a gradient represented by a certain reference color is a color at +30 degrees from the reference color in the hue circle. The second reference color is a color at −30 degrees from the reference color in the hue circle.

Characteristics According to the present embodiment, the graduations are assigned to the cells 920 in the color code 900, and the characteristics of the color code 900 are improved as compared with a two-dimensional code according to a related art. The characteristics are a property that characterizes that the optical symbol is a two-dimensional code, and that is used to adjust a position, a direction, and a size in recognizing the code from the image. Improving the characteristics can reduce erroneous detection in recognizing a code.

When each cell 920 is binarized in a manner that a certain range of hue from the hue of the reference color 921 is black and the other range of hue is white, a characteristic geometric graphic (referred to as a "characteristic pattern") can be obtained from the data portion 910. By performing pattern matching between the characteristic pattern obtained from the data portion 910 and a predetermined pattern, erroneous detection can be reduced.

However, the method of acquiring the characteristic pattern is not limited to binarization. The characteristic pattern may be obtained by representing a change amount of hue of each cell 920 (for example, an amount by which the degree of hue increases) in a grayscale image. In this case, pattern matching between the characteristic pattern and a predetermined grayscale image is performed.

Figure 3A:
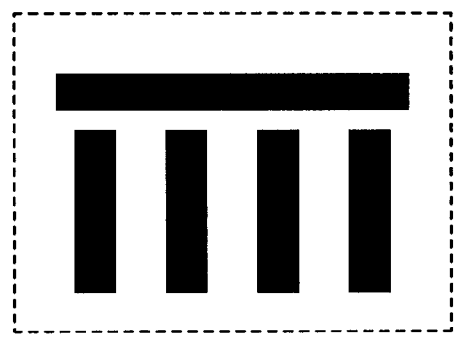
FIGS. 3A to 3C are diagrams each illustrating an example of a characteristic pattern according to the first embodiment of the present disclosure.
Figure 3B:
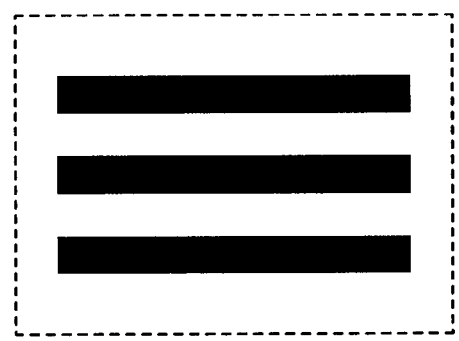
Figure 3C:

FIGS. 3A to 3C are diagrams each illustrating an example of a characteristic pattern according to the present embodiment. As illustrated in FIGS. 3A to 3C, the characteristic pattern is represented by a combination of elongated rectangles of which a hue is included in a certain range from the reference color of each cell. Regarding identifying the color code, when a characteristic pattern extracted from the image matches a preset pattern, identification is performed on an area of the image.

With the color code 900 according to the present embodiment, a pattern contributing to the characteristics can be extracted from the gradient assigned to the cell 920. Accordingly, an area for representing the characteristics alone does not have to be provided, and the area of the data portion in the entire two-dimensional code increases, accordingly.

For example, in a two-dimensional code called a QR CODE (registered trademark), cells contributing to characteristics called a finder pattern, an alignment pattern, and a timing pattern are set. In the case of the QR CODE (registered trademark), though varying depending on the model and the version, an area of data portion is approximately 20 percent of the entire area of the code.

In addition, for example, in a color code called a CHAMELEON CODE (registered trademark), a black frame contributing to characteristics is set so as to surround each cell. In the case of the CHAMELEON CODE (registered trademark), though varying depending on the model and the version, an area of data portion is approximately 30 percent of the entire area of the code.

In the color code 900 according to the present embodiment, an area of the data portion is approximately 65 percent of the entire area of the code. Accordingly, the color code according to the present embodiment is improved in characteristics as compared with the two-dimensional codes according to related arts.

Information Amount

According to the present embodiment, an amount of information of the color code 900 in which the gradients are assigned to the cells 920 is increased as compared with that of the two-dimensional codes according to related arts.

As described above, a direction in which the hue of the gradient increases is set. For example, in two orthogonal axes such as the vertical direction and the horizontal direction, when the hue increases in the forward direction or the backward direction, four directions can be set. For example, the four directions are a first direction that is from top to bottom, a second direction that is from bottom to top, a third direction that is from right to left, and a fourth direction that is from left to right.

A combination of cells and directions is $\alpha$ to the power of $\beta$ ($\alpha\beta$), where $\alpha$ is the number of directions and $\beta$ is the number of cells. When the four directions are set and the cells are arranged in four columns and three rows, the amount of information is 16 million (=4$^{12}$).

When the directions of the gradients are used for data representation, the possible colors of each cell are limited, and the identification performance is improved. For example, an even number is set to a case that the direction of the gradient is the first direction (from top to bottom) or the third direction (from right to left), and an odd number is set to a case that the direction of the gradient is the second direction (from bottom to top) or the fourth direction (from left to right).

With this configuration, six types of values can be represented by three types of reference colors.

When there are three types of reference colors, the reference colors are set to intervals of 120 degrees in the hue circle, so that the identification performance is improved. In the color code according to the present embodiment, a gradient is assigned to each of the plurality of cells arranged in the data portion. With this configuration, in the color code according to the present embodiment, the characteristics and the amount of information are improved. Accordingly, even when having a small number of cells, the color code according to the present embodiment can be detected with high accuracy. As a result, the color code according to the present embodiment can reduce the influence of vibration even when having a small area.

Second Embodiment

According to a second embodiment of the present disclosure, a code reading system reads the color code according to the first embodiment. The code reading system according to the present embodiment identifies a code represented by a color code based on an image including a video image obtained by capturing an object to which the color code is attached, and stores the image and the code in association with each other.

Overall Configuration of Code Reading System

Figure 4:
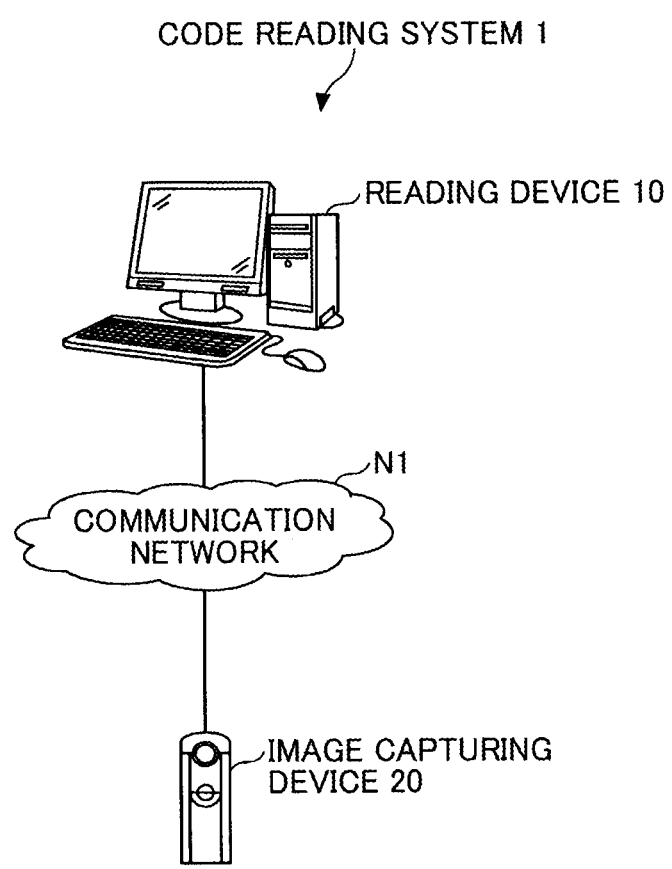
FIG. 4 is a diagram illustrating an example of an overall configuration of a code reading system according to a second embodiment of the present disclosure.

An overall configuration of a code reading system 1 according to the present embodiment is described with reference to FIG. 4. FIG. 4 is a diagram illustrating an example of an overall configuration of the code reading system 1 according to the present embodiment.

As illustrated in FIG. 4, the code reading system 1 according to the present embodiment includes a reading device 10 and an image capturing device 20. The reading device 10 and the image capturing device 20 are connected to a communication network N1.

The connected devices can communicate with each other through the communication network N1. The communication network N1 is, for example, a wired communication network such as the Internet, a local area network (LAN), or a wide area network (WAN).

The communication network N1 may include, in addition to wired communication, a network based on wireless communication such as wireless LAN or short-range wireless communication, or mobile communication such as worldwide interoperability for microwave access (WiMAX), long term evolution (LTE), or 5th generation (5G).

The image capturing device 20 is provided in a facility where an object to which a color code is attached is present. In the present embodiment, the number of facilities may be more than one. When there is a plurality of facilities, one or more image capturing devices are provided in each facility.

The reading device 10 is an information processing device that reads a color code from an image including a video image captured by the image capturing device 20. An example of the reading device 10 is a computer.

The reading device 10 receives an image including a video image obtained by capturing a predetermined angle of view in the facility from the image capturing device 20. The reading device 10 detects the color code from the received video image and reads a code represented by the color code. The reading device 10 further stores the video image and a reading result in association with each other in time series.

The image capturing device 20 is an electronic device that captures a predetermined angle of view in a facility where an object to which a color code is attached is present. An example of the image capturing device 20 is an omnidirectional imaging device.

The image capturing device 20 is provided at a position where an image of the object to which the color code is attached can be captured. The image capturing device 20 is set on a ceiling or a wall surface of the facility, for example.

The image capturing device 20 is not limited to the omnidirectional imaging device as long as having a communication function. The image capturing device 20 includes, for example, an output device such as a Projector (PJ), an Interactive White Board (a white board having an electronic whiteboard function capable of mutual communication (IWB)), and a digital signage, a Head Up Display (HUD) device, an industrial machine, an imaging device, a sound collecting device, a medical device, a network home appliance, an automobile (connected car), a notebook Personal Computer (PC), a mobile phone, a smartphone, a tablet terminal, a game console, a Personal Digital Assistant (PDA), a digital camera, a wearable PC or a desktop PC.

Hardware Configuration of Code Reading System

A hardware configuration of each device included in the code reading system 1 according to the present embodiment is described below with reference to FIGS. 5 and 6.

Hardware Configuration of Computer

Figure 5:
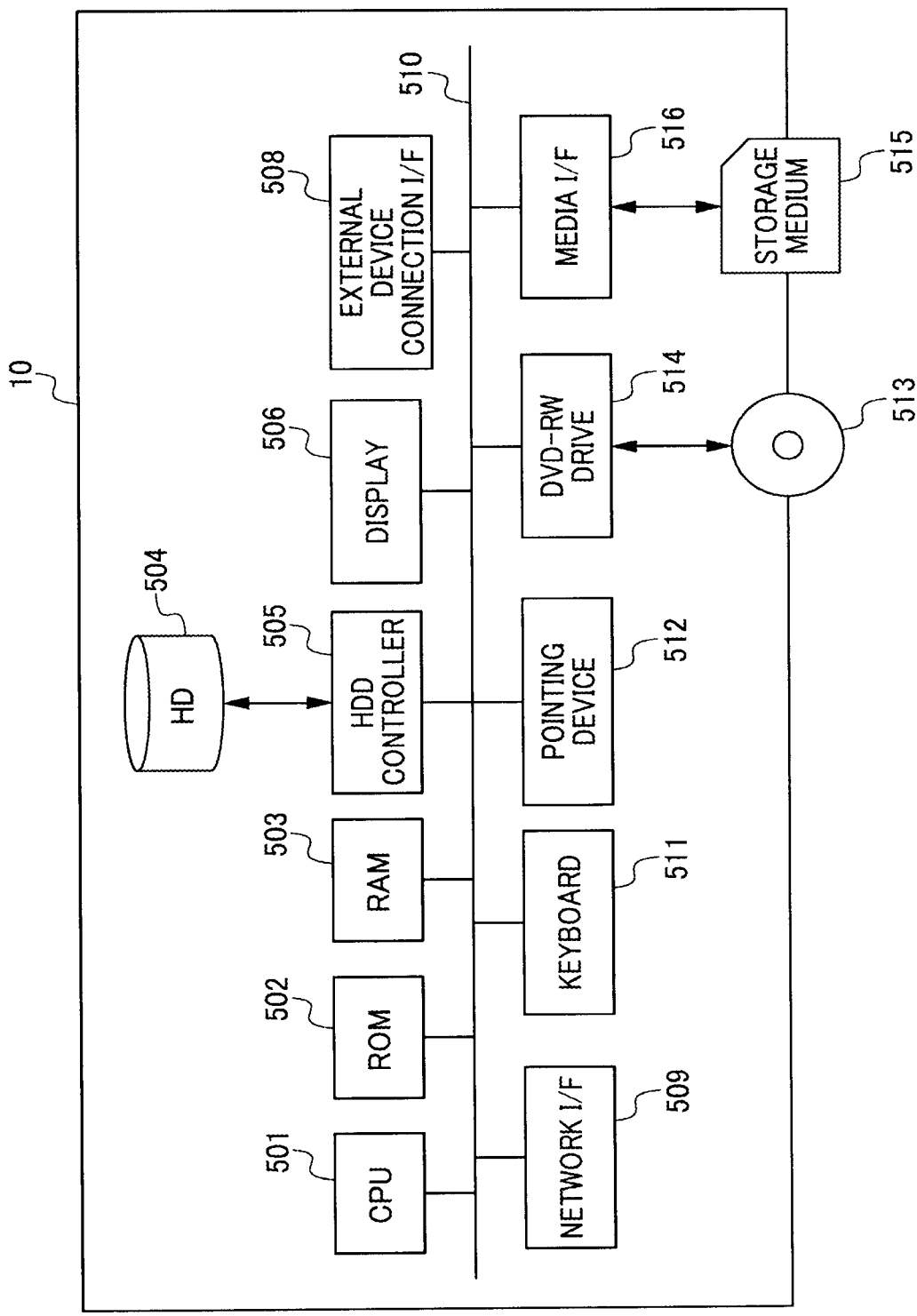
FIG. 5 is a block diagram illustrating an example of a hardware configuration of a computer according to the second embodiment of the present disclosure.

FIG. 5 is a block diagram illustrating an example of a hardware configuration of the reading device 10 implemented by a computer according to the present embodiment.

As illustrated in FIG. 5, the computer includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk ReWritable (DVD-RW) drive 514, and a media I/F 516.

The CPU 501 controls the entire operation of the computer. The ROM 502 stores programs such as an initial program loader (IPL) to boot the CPU 501. The RAM 503 is used as a work area for the CPU 501. The HD 504 stores various data such as a program. The HDD controller 505 controls reading and writing of various data from and to the HD 504 under control of the CPU 501.

The display 506 displays various information such as a cursor, a menu, a window, a character, or an image. The external device connection I/F 508 is an interface for connecting various external devices. Examples of the external devices include, but not limited to, a universal serial bus (USB) memory and a printer. The network I/F 509 is an interface for performing data communication using a communication network N1. The bus line 510 is an address bus or a data bus that electrically connects the elements illustrated in FIG. 5, such as the CPU 501, to each other.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable recording medium. The removable storage medium is not limited to the DVD-RW and may be a Digital Versatile Disc-Recordable (DVD-R) or the like. The media I/F 516 controls reading and writing (storing) of data from and to a storage medium 515, such as a flash memory.

Hardware Configuration of Omnidirectional Imaging Device

Figure 6:
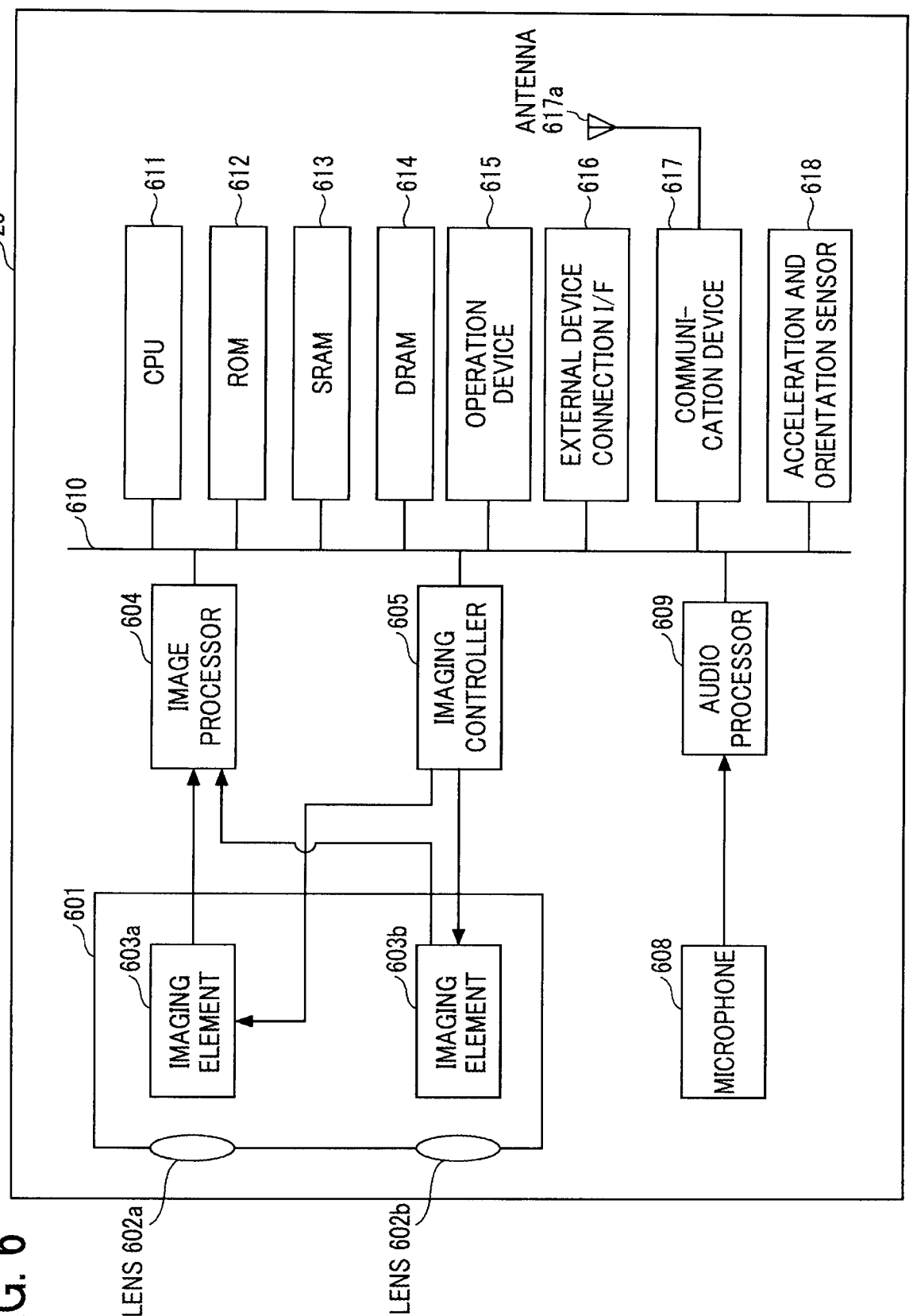
FIG. 6 is a block diagram illustrating an example of a hardware configuration of an omnidirectional imaging device according to the second embodiment of the present disclosure.

FIG. 6 is a block diagram illustrating an example of a hardware configuration of the image capturing device 20 implemented by an omnidirectional imaging device according to the present embodiment. The following describes a case in which the omnidirectional imaging device is a spherical (omnidirectional) image capturing device having two imaging elements. However, the image capturing device may include any suitable number of imaging elements, providing that it includes at least two imaging elements. In addition, the image capturing device 20 is not necessarily a device dedicated to omnidirectional image capturing. Alternatively, an external omnidirectional image capturing unit may be attached to a general-purpose digital camera or a smartphone to implement an image capturing device having substantially the same function as that of the image capturing device 20 according to the present embodiment.

As illustrated in FIG. 6, the omnidirectional imaging device according to the present embodiment includes an imaging unit 601, an image processor 604, an imaging controller 605, a microphone 608, an audio processor 609, a CPU 611, a ROM 612, a static random access memory (SRAM) 613, a dynamic random access memory (DRAM) 614, an operation device 615, an external device connection I/F 616, a communication device 617, an antenna 617a, and an acceleration and orientation sensor 618.

The imaging unit 601 includes two wide-angle lenses (so-called fisheye lenses) 602a and 602b, each having an angle of view of equal to or greater than 180 degrees to form a hemispherical image. The imaging unit 601 further includes two imaging elements 603a and 603b corresponding to the wide-angle lenses 602a and 602b respectively. Each of the imaging elements 603a and 603b includes an imaging sensor such as a Complementary Metal Oxide Semiconductor (CMOS) sensor and a charge-coupled device (CCD) sensor, a timing generation circuit, and a group of registers. The imaging sensor converts an optical image formed by the fisheye lenses 602a and 602b into electric signals to output image data. The timing generation circuit generates horizontal or vertical synchronization signals, pixel clocks and the like for the imaging sensor. Various commands, parameters and the like for operations of the imaging elements 603a and 603b are set in the group of registers.

Each of the imaging elements 603a and 603b of the imaging unit 601 is connected to the image processor 604 through a parallel I/F bus. The imaging elements 603a and 603b of the imaging unit 601 is connected to the imaging controller 605 via a serial I/F bus such as an inter-integrated circuit (I2C) bus. The image processor 604, the imaging controller 605, and the audio processor 609 are connected to the CPU 611 via a bus 610. The ROM 612, the SRAM 613, the DRAM 614, the operation device 615, the external device connection I/F 616, the communication device 617, and the acceleration and orientation sensor 618 are also connected to the bus 610.

The image processor 604 acquires image data from each of the imaging elements 603a and 603b via the parallel I/F bus and performs predetermined processing on each image data. Thereafter, the image processor 604 combines these image data to generate data of an equirectangular projection image.

The imaging controller 605 usually serves as a master device, whereas the imaging elements 603a and 603b usually serves as a slave device. The imaging controller 605 sets commands and the like in the groups of registers of the imaging elements 603a and 603b through the I2C bus. The imaging controller 605 receives the commands and the like from the CPU 611. The imaging controller 605 obtains status data and the like in the groups of registers of the imaging elements 603a and 603b through the I2C bus. The imaging controller 605 then transmits the obtained data to the CPU 611.

The imaging controller 605 instructs the imaging elements 603a and 603b to output the image data at a timing when the shutter button of the operation device 615 is pressed. In some cases, the omnidirectional imaging device is configured to display a preview image on a display (e.g., the display of the smartphone) or display a moving image (movie). In a case of displaying moving image (movie), image data is continuously output from the imaging elements 603a and 603b at a predetermined frame rate (frames per minute).

As described later, the imaging controller 605 operates in cooperation with the CPU 611 to function as a synchronization control device that makes output timings of the image data from the respective imaging elements 603a and 603b synchronous. The omnidirectional imaging device according to the present embodiment is not provided with a display. However, in some embodiments, the omnidirectional imaging device may include a display.

The microphones 608 convert sound into audio (signal) data. The audio processor 609 receives the audio data output from the microphone 608 via an I/F bus and performs predetermined processing on the audio data.

The CPU 611 controls entire operation of the omnidirectional imaging device, for example, by performing predetermined processing. The ROM 612 stores various programs to be executed by the CPU 611. Each of the SRAM 613 and the DRAM 614 is a work memory and stores programs being executed by the CPU 611 or data being processed. In particular, in one example, the DRAM 614 stores image data being processed by the image processor 604 and processed data of an equirectangular projection image.

The operation device 615 collectively refers to various operation buttons such as a shutter button. The user operates the operation device 615 to input various image capturing (photographing) modes or image capturing (photographing) conditions.

The external device connection I/F 616 is an interface for connecting various external devices. The external device in this case is, for example, a USB memory. The data of the equirectangular projection image, which is stored in the DRAM 614, is stored in the external medium via the external device connection I/F 616 or transmitted to an external terminal (apparatus) via the external device connection I/F 616, as appropriate.

The communication device 617 communicates data with an external device such as a smartphone via the antenna 617a included in the omnidirectional imaging device through a short-range wireless communication technology such as Wi-Fi, near field communication (NFC), and BLUETOOTH. The communication device 617 further transmits the data of the equirectangular projection image to an external device such as a smartphone.

The acceleration and orientation sensor 618 calculates an orientation of the omnidirectional imaging device from the Earth's magnetism to output orientation information. The orientation information is an example of related information, which is metadata described in compliance with Exif. This information is used for image processing such as image correction of captured images. The related information also includes data indicating a time (date) when the image is captured, and data indicating a size of image data (an amount of image data), for example. The acceleration and orientation sensor 618 detects the change in tilt (roll, pitch, yaw) with movement of the omnidirectional imaging device. The change in tilt is one example of related information (metadata) described in compliance with Exif. This information is used for image processing such as image correction of captured images.

The acceleration and orientation sensor 618 further detects acceleration in three axial directions. The omnidirectional imaging device calculates position (an angle with respect to the direction of gravity) of the omnidirectional imaging device, based on the acceleration detected by the acceleration and orientation sensor 618. Including the acceleration and orientation sensor 618 allows the omnidirectional imaging device to correct images with high accuracy.

Functional Configuration of Code Reading System

Figure 7:
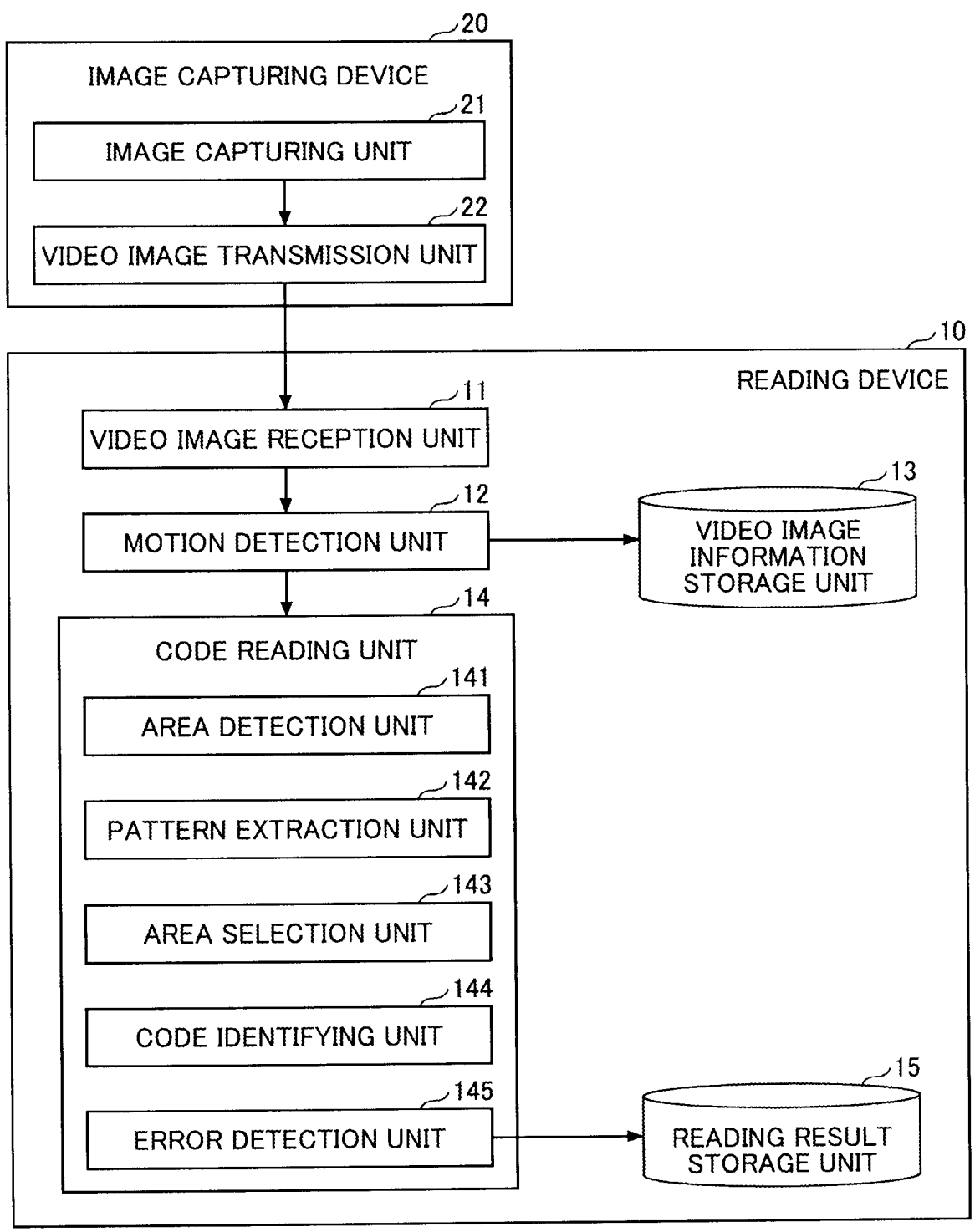
FIG. 7 is a diagram illustrating an example of a functional configuration of the code reading system according to the second embodiment of the present disclosure.

A configuration of the code reading system 1 according to the present embodiment is described below with reference to FIG. 7. FIG. 7 is a block diagram illustrating a functional configuration of each device included in the code reading system 1 according to the present embodiment.

Functional Configuration of Reading Device

As illustrated in FIG. 7, the reading device 10 according to the present embodiment includes a video image reception unit 11, a motion detection unit 12, a video image information storage unit 13, a code reading unit 14, and a reading result storage unit 15. The code reading unit 14 according to the present embodiment includes an area detection unit 141, a pattern extraction unit 142, an area selection unit 143, a code identifying unit 144, and an error detection unit 145.

The video image reception unit 11, the motion detection unit 12, and the code reading unit 14 are implemented by, for example, processing executed by the CPU 501 and the HDD controller 505 according to a program loaded from the HD 504 to the RAM 503 illustrated in FIG. 5.

The video image information storage unit 13 and the reading result storage unit 15 are implemented by using, for example, the HD 504 illustrated in FIG. 5. Reading or writing of information stored in the HD 504 is performed via, for example, the HDD controller 505.

The video image reception unit 11 receives video image information from the image capturing device 20. The video image information is a video image signal obtained by capturing a predetermined angle of view in the facility in which the image capturing device 20 is provided. The video image reception unit 11 transmits the received video image information to the motion detection unit 12.

The motion detection unit 12 detects a motion of an object captured in the video image information received from the video image reception unit 11. When a moving object is detected, the motion detection unit 12 stores the video image information in the video image information storage unit 13 and transmits the video image information to the code reading unit 14.

The video image information storage unit 13 stores the video image information in which an image of the moving object is captured in time series.

Based on the video image information received from the motion detection unit 12, the code reading unit 14 reads a color code included in the video image information. The code reading unit 14 stores a reading result obtained by reading the color code from the video image information, in the reading result storage unit 15.

The area detection unit 141 detects an area having a predetermined shape from the video image information received by the code reading unit 14. The predetermined shape is a shape of the color code to be read. The color code illustrated in FIG. 1 has a rectangle shape having a ratio of a long side to a short side of 4:3.

The pattern extraction unit 142 extracts a characteristic pattern based on a linear gradient included in the area detected by the area detection unit 141. The characteristic pattern is a geometric graphic representing characteristics of each part of the area.

The area selection unit 143 selects an area of which the characteristic pattern extracted by the pattern extraction unit 142 matches or is similar to a predetermined pattern. The predetermined pattern is a geometric graphic representing characteristics of a color code to be read.

The code identifying unit 144 identifies a code based on the linear gradient included in the area selected by the area selection unit 143. Identifying the code is performed by determining a value of each cell based on the reference color of the linear gradient assigned to each cell and a direction to which the hue increases.

When an error detection code is included in the code identified by the code identifying unit 144, the error detection unit 145 detects an error from the code. When an error correction code is included in the code, the error detection unit 145 may correct an error detected from the code when the error is detected from the code. The error detection unit 145 transmits the code from which an error is not detected or the code of which an error is corrected to the code reading unit 14 as a reading result.

The reading result storage unit 15 stores the reading result obtained when the code reading unit 14 reads the color code from the video image information. The read result is stored in a read result table. The reading result table is described later.

Functional Configuration of Image Capturing Device

As illustrated in FIG. 7, the image capturing device 20 according to the present embodiment includes an image capturing unit 21 and a video image transmission unit 22.

The image capturing unit 21 acquires a video image captured at a predetermined angle of view in the facility in which the image capturing device 20 is provided. The image capturing unit 21 is implemented by, for example, processing executed by the CPU 611 and the imaging controller 605 according to a program loaded from the ROM 612 to the SRAM 613 illustrated in FIG. 6.

The video image transmission unit 22 transmits video image information representing content of a video image obtained by the image capturing unit 21 to the reading device 10. The video image transmission unit 22 is implemented by, for example, processing executed by the CPU 611 and the external device connection I/F 616 according to a program loaded from the ROM 612 to the SRAM 613 illustrated in FIG. 6.

Figure 8:
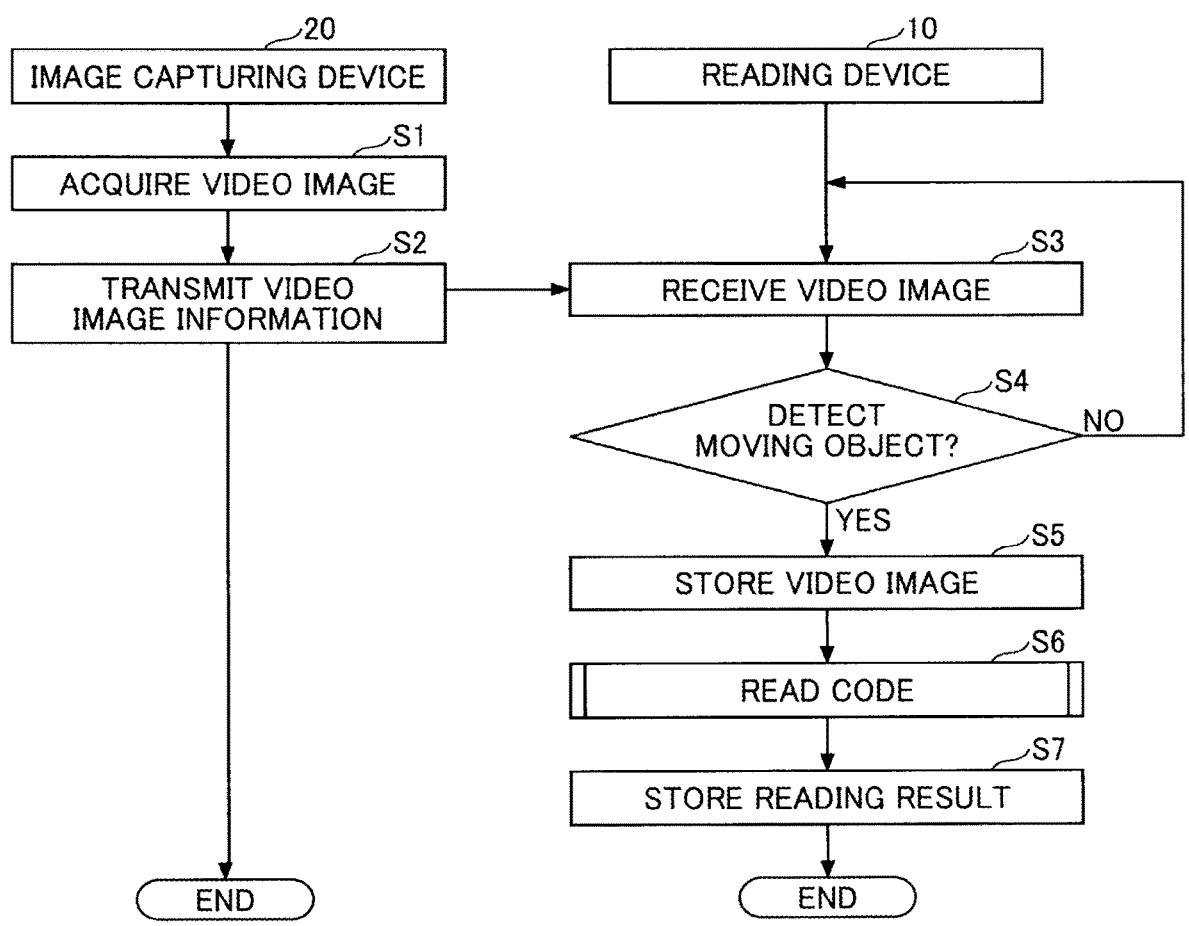
FIG. 8 is a sequence diagram illustrating an example of a code reading method according to the second embodiment of the present disclosure.

Code Reading Method Details of a cord reading method performed by the code reading system 1 according to the present embodiment are described below with reference to FIG. 8. FIG. 8 is a sequence diagram illustrating an example of a code reading method according to the present embodiment.

In step S1, the image capturing unit 21 included in the image capturing device 20 acquires a video image (in other words, image time series) obtained by capturing a predetermined angle of view in the facility in which the image capturing device 20 is provided. The image capturing unit 21 transmits the captured video image to the video image transmission unit 22.

The image capturing unit 21 may periodically acquire still images at predetermined time intervals and generate a video image by arranging the obtained still images in a time series. The image capturing unit 21 according to the present embodiment constantly acquires the video image during a period of time during which the facility is operating.

In step S2, the video image transmission unit 22 included in the image capturing device 20 receives the video image from the image capturing unit 21. The video image transmission unit 22 transmits video image information representing content of the received video image to the reading device 10.

In step S3, the video image reception unit 11 included in the reading device 10 receives the video image information from the image capturing device 20. The video image reception unit 11 transmits the received video image information to the motion detection unit 12.

In step S4, the motion detection unit 12 included in the reading device 10 receives the video image information from the video image reception unit 11. The motion detection unit 12 detects the motion of the object captured in the received video image information.

When the object that is moving is detected (YES), the motion detection unit 12 subsequently performs processing of step S5. When the object that is moving is not detected (NO), the motion detection unit 12 returns to step S3 and waits until the next video image is received.

In Step S5, the motion detection unit 12 included in the reading device 10 stores the video image information of the detected moving object in the video image information storage unit 13. The motion detection unit 12 transmits the video image information to the code reading unit 14.

In step S6, the code reading unit 14 included in the reading device 10 receives the video image information from the motion detection unit 12. The code reading unit 14 reads a color code included in the video image information based on the received video image information.

Figure 9:
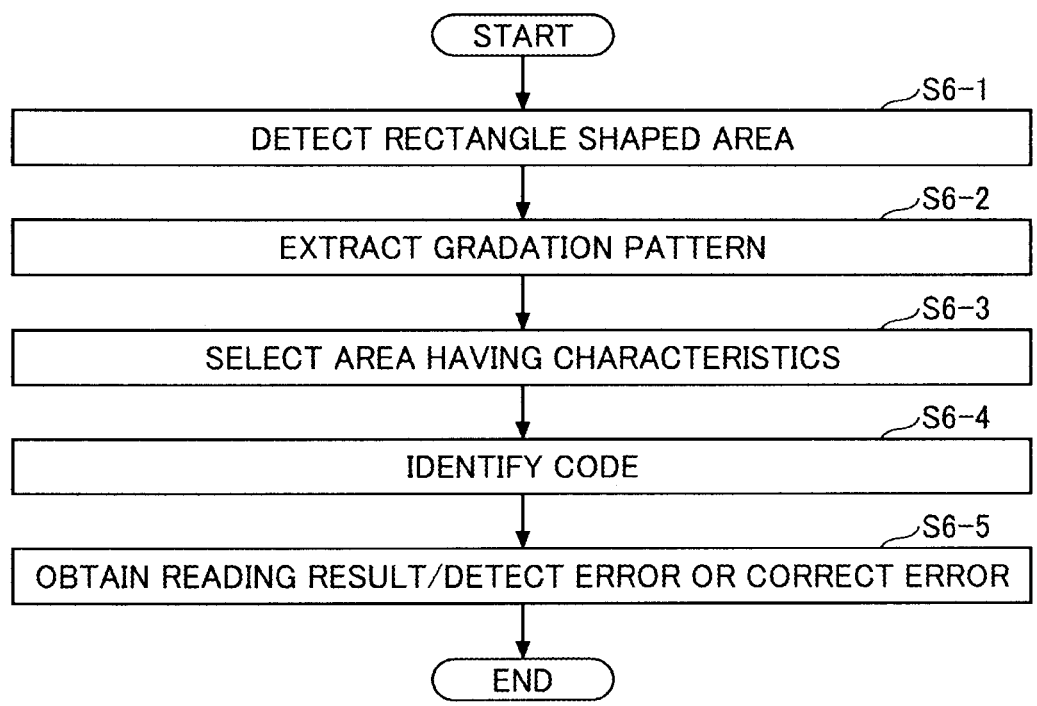
FIG. 9 is a flowchart illustrating an example of a code identifying process according to the second embodiment of the present disclosure.

Code Reading Process A code reading process (step S6 in FIG. 8) according to the present embodiment is described with reference to FIG. 9. FIG. 9 is a flowchart illustrating an example of a code reading process according to the present embodiment.

In step S6-1, the area detection unit 141 detects an area having a predetermined shape from the video image information received by the code reading unit 14. The predetermined shape is a shape of the color code to be read.

Specifically, the area detection unit 141 binarizes the video image information based on saturation. In other words, the video image information is binarized by classifying the video image information into a portion where the saturation is equal to or greater than a predetermined threshold value and a portion where the saturation is less than the threshold value. The area detection unit 141 detects an area that matches or is similar to the predetermined shape in the portion in which the saturation is equal to or greater than the predetermined threshold value.

Then, the area detection unit 141 transmits detection area information representing the area detected from the video image information to the pattern extraction unit 142.

In step S6-2, the pattern extraction unit 142 receives the detection area information from the area detection unit 141. The pattern extraction unit 142 extracts a linear gradient included in each area based on the received detection area information. Subsequently, the pattern extraction unit 142 extracts a characteristic pattern based on the extracted linear gradient. The characteristic pattern is a geometric graphic representing the characteristics of the area.

Specifically, the pattern extraction unit 142 acquires a reference color from a position corresponding to each cell in the area. The pattern extraction unit 142 binarizes each area by classifying the area into a part that is included in a certain range from the hue of the obtained reference color and another part that is not included in the certain range. Subsequently, the pattern extraction unit 142 extracts a geometric graphic represented in each binarized area as a characteristic pattern.

Then, the pattern extraction unit 142 transmits the characteristic pattern extracted from each area to the area selection unit 143.

In step S6-3, the area selection unit 143 receives the characteristic pattern of each area from the pattern extraction unit 142. The area selection unit 143 determines whether the characteristic pattern of each area matches a predetermined pattern or not. The predetermined pattern is a geometric graphic representing the characteristics of a color code to be read.

Subsequently, the area selection unit 143 selects an area of which the characteristic pattern matches the predetermined pattern. Then, the area selection unit 143 transmits selected area information representing the selected area to the code identifying unit 144.

In step S6-4, the code identifying unit 144 receives the selected area information from the area selection unit 143. The code identifying unit 144 extracts a linear gradient included in each area based on the received selected area information. Subsequently, the code identifying unit 144 identifies the code based on the extracted linear gradient. Then, the code identifying unit 144 transmits the code identified from each area to the error detection unit 145.

Identifying the code is performed by determining the value of each cell based on the reference color of the linear gradient assigned to each cell and the direction in which the hue increases. The value determined by the combination of the reference color and the direction varies depending on the color code to be read.

Figures 10A, 10B, 10C:
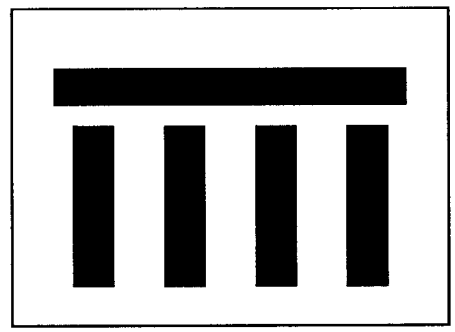
FIGS. 10A to 10C are diagrams illustrating an example of a code according to the second embodiment of the present disclosure.

FIGS. 10A to 10C are diagrams illustrating an example of a code. The example of FIGS. 10A to 10C is a color code in which a value of 0 to 5 is set to each cell by a combination of three types of reference colors and two types of directions.

FIG. 10A illustrates an example of a characteristic pattern extracted from an area. Since the characteristic pattern is a part of which the hue is within a certain range from the reference color, a long side of the rectangle included in the characteristic pattern is orthogonal to the direction of the linear gradient. Accordingly, in the example of FIG. 10A, the cell in the first row indicates that the direction of the linear gradient is in the vertical direction, and the cells in the second and third rows indicate that the direction of the linear gradient is in the horizontal direction.

FIG. 10B illustrates an example of a result of identifying the direction of the linear gradient assigned to each cell. In the example of FIG. 10B, the gradient directions are indicated by 0 representing the first direction (from top to bottom), 1 representing the second direction (from bottom to top), 2 representing the third direction (from right to left), and 3 representing the fourth direction (from left to right). Accordingly, in the example of FIG. 10B, the cell in the first row is 0 or 1, and the cells in the second and third rows are 2 or 3.

FIG. 10C illustrates an example of an identification result obtained by determining the value of each cell. In the example of FIG. 10C, the code is identified as an even number in the first direction (from top to bottom) and the third direction (from right to left), and as an odd number in the second direction (from bottom to top) and the fourth direction (from left to right). Accordingly, in the example of FIG. 10C, the cells having 0 or 2 in FIG. 10B have an even number, and the cells having 1 or 3 in FIG. 10B have an odd number.

Referring back to FIG. 9, in step S6-5, the error detection unit 145 receives the code of each area from the code identifying unit 144. When an error detection code is included in the code, the error detection unit 145 performs error detection on the code. When an error correction code is included in the code, the error detection unit 145 may correct an error detected from the code when the error is detected from the code.

The error detection unit 145 transmits the code from which an error is not detected or the code of which an error is corrected to the code reading unit 14 as a reading result.

Referring back to FIG. 8, in step S7, the code reading unit 14 included in the reading device 10 stores the reading result of the color code in a reading result table of the reading result storage unit 15.

Reading Result Table

The reading result table according to the present embodiment is described with reference to FIG. 11. FIG. 11 is a diagram illustrating an example of a reading result table 1000 according to the present embodiment.

As illustrated in FIG. 11, the reading result table 1000 according to the present embodiment includes data items of X coordinate, Y coordinate, image capturing device, code, update date and time, and remarks.

The X coordinate and the Y coordinate are coordinates at which the color code is detected in the video image. The X coordinate and the Y coordinate are represented by, for example, the number of pixels from the origin (upper left of the image). The item of image capturing device indicates information indicating the image capturing device 20 that captured the video image. The item of code indicates a code identified from the color code. The update date and time is automatically set when the reading result is stored.

The code reading system according to the present embodiment identifies a code represented by a color code from an image obtained by capturing a video image of an object to which the color code according to the first embodiment is attached. In the color code according to the first embodiment, gradient is assigned to each cell in the data portion in which the plurality of cells is arranged. Accordingly, according to the code reading system of the present embodiment, the code can be read with high accuracy from a video image in which an object to which a color code having a small area is attached is moving.

Examples of Application

The code reading system according to the present embodiment can be applied to, for example, management of a pallet used for carrying articles in a distribution site. Specifically, a color code representing identification information for identifying a pallet is attached to the pallet, and each individual pallet to be carried in or out is identified at a truck yard of a distribution warehouse, for example. This allows a user to manage the types and the number of pallets present in the distribution warehouse, for example.

Figure 12:
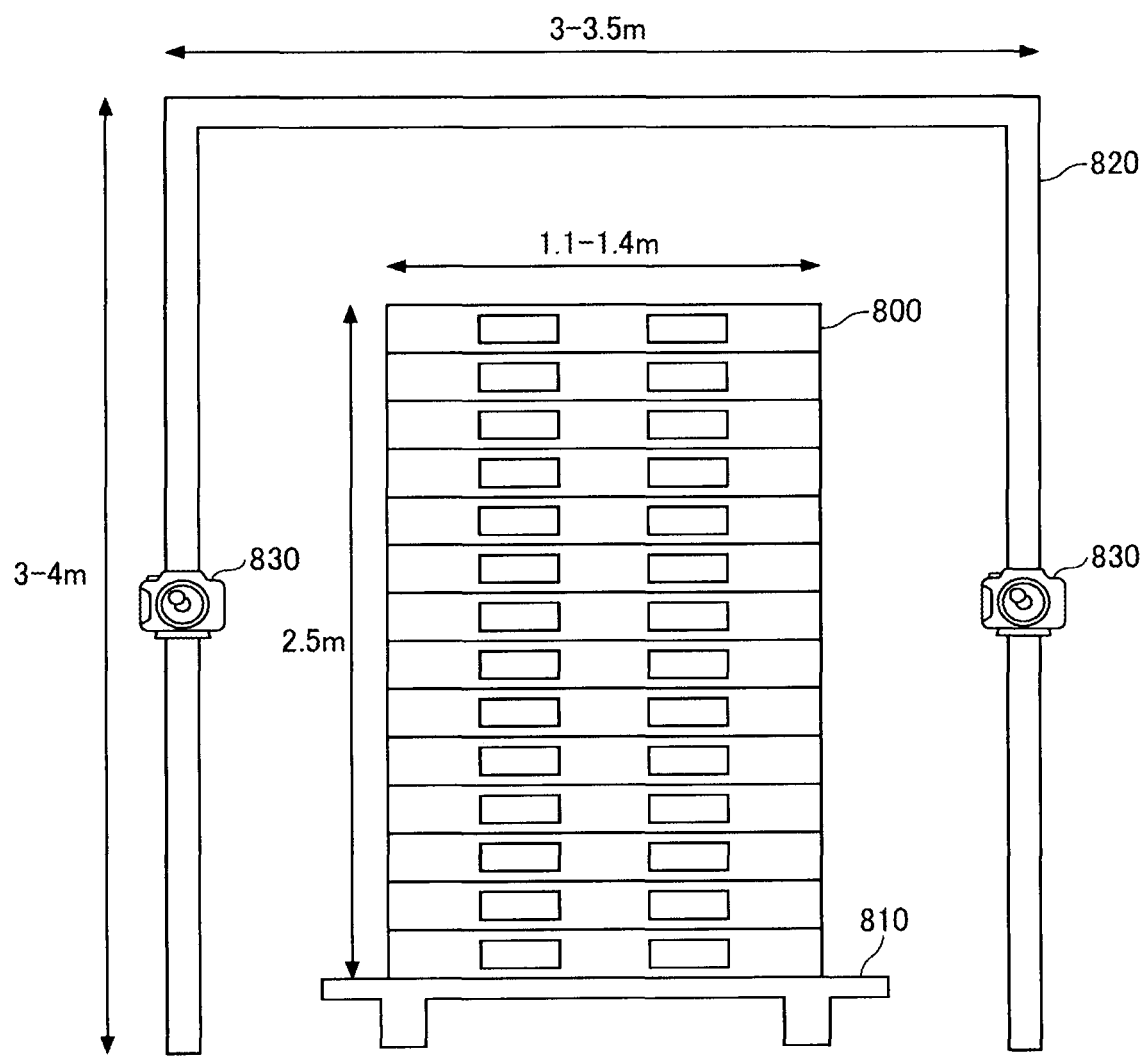
FIG. 12 is a diagram illustrating an example of a pallet loading method according to an application example.

FIG. 12 is a diagram illustrating an example of a pallet loading method in the present application example. As illustrated in FIG. 12, a pallet 800 to which a color code is attached is loaded on a carriage 810 and passes through a gate 820 provided in a truck yard. A camera 830 for acquiring a video image of the pallet 800 is installed on a wall surface of the gate 820. The carriage 810 passes through the gate 820 at a speed of approximately 1 m (meters) per second, for example.

Figure 13:
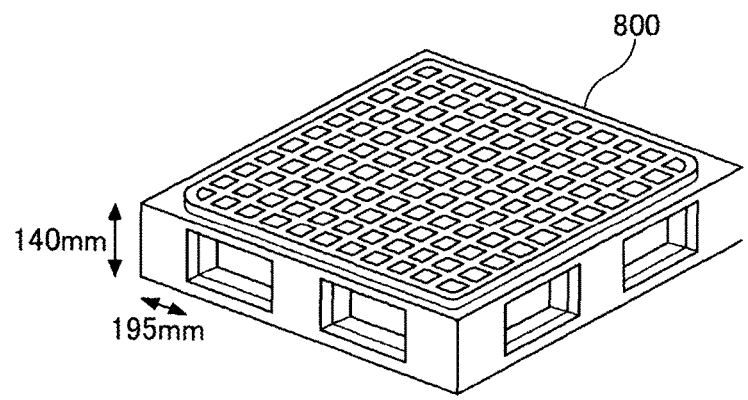
FIG. 13 is a diagram illustrating an example of a position on which a color code is attached according to the application example.

FIG. 13 is a diagram illustrating an example of a position on which a color code is attached in the present application example. As illustrated in FIG. 13, on a side surface of the pallet 800, an area to which the color code can be attached has approximately a vertical length of 140 mm and a horizontal length of 195 mm.

Figure 14:
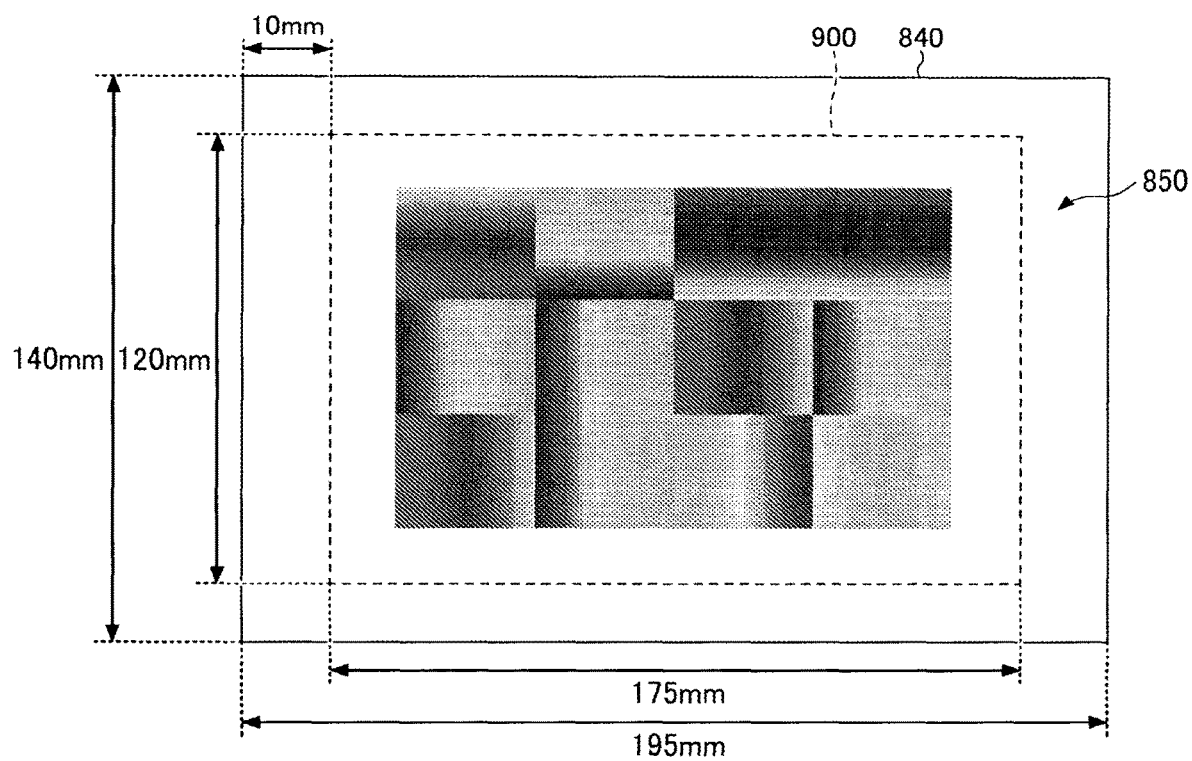
FIG. 14 is a diagram illustrating an example of dimensions of the color code according to the application example.

FIG. 14 is a diagram illustrating an example of dimensions of a color code in the present application example. As illustrated in FIG. 14, when the color code 900 is attached to the position illustrated in FIG. 13, the area of the color code 900 has approximately a vertical length of 120 mm and a horizontal length 175 mm. FIG. 14 illustrates an example in which the color code 900 is attached by a sticker 840, and a sticker attaching portion 850 having 10 mm is provided around the color code.

According to a related art, to identify a code that is a two-dimensional code from an image obtained by capturing an image of the pallet 800 loaded on the carriage 810 and moving through the gate 820 in the truck yard with sufficient accuracy is difficult. By using the color code according to the first embodiment, the information amount and the characteristics are improved even in a small area, and detection with high accuracy even in the above-described situation can be achieved.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the embodiments described above are merely one example of plural computing environments that implement one or more embodiments of the disclosure. In some embodiments, the management server includes multiple computing devices, such as a server cluster. The plural computing devices communicate with one another through any type of communication link including a network, shared memory, etc., and perform the processes disclosed herein.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

With a two-dimensional code according to a related art, the detection accuracy is lowered when the area is reduced. For example, in a case of an application in which an object to which a two-dimensional code is attached moves, as the area of the two-dimensional code becomes smaller, the influence of vibration generated when the object moves becomes relatively larger, and detection omission or erroneous detection can easily occur. When the area of the cells included in the two-dimensional code is increased in order to reduce the influence of vibration, the number of cells included in the two-dimensional code is reduced, and the information amount and the characteristics are reduced accordingly.

According to an embodiment of the present disclosure, an optical symbol that has a small number of cells and that is detectable with high accuracy is provided.

According to an embodiment of the disclosure includes a non-transitory recording medium storing a plurality of instructions which, when executed by one or more processors, causes the processors to perform a method. The method includes detecting an area having a predetermined shape from a captured image including an optical symbol, extracting a characteristic pattern based on a linear gradient included in the area, selecting the area in which the characteristic pattern matches a predetermined pattern, and identifying a code based on the linear gradient included in the area.

The invention claimed is:

1. A color code, comprising:
a data portion in which a plurality of cells is arranged, each of the plurality of cells being assigned with a color gradient according to a value, the color gradient having a degree of hue which gradually changes in a predetermined direction within the each of the plurality of cells.

2. The color code of claim 1, wherein
the color gradient has the degree of hue which gradually increases in the predetermined direction within the each of the plurality of cells.

3. The color code of claim 2, wherein the predetermined direction is one of four directions along two orthogonal axes.

4. The color code of claim 3, wherein the predetermined direction of the color gradient is determined based on a classification of the value.

5. The color code of claim 2, wherein the predetermined direction includes a plurality of directions, and the data portion has a characteristic represented by a combination of the plurality of directions of a plurality of color gradients each of which is assigned to a corresponding one of the plurality of cells.

6. The color code of claim 1, wherein the data portion has a quadrilateral shape in which the plurality of cells are two-dimensionally connected to each other, each of the plurality of cells having a square shape.

7. The color code of claim 6, wherein each of the plurality of cells is in contact with an adjacent one or more of the plurality of cells.

8. The color code of claim 1, wherein each of the plurality of cells has a square shape with four sides, and the color gradient has the degree of hue which gradually changes from one of the four sides to another one of the four sides in the each of the plurality of cells.

9. An information processing device comprising circuitry configured to:
- detect an area having a predetermined shape from a captured image including a color code;
- extract a characteristic pattern based on a color gradient of the color code included in the area;
- select the area in which the characteristic pattern matches a predetermined pattern; and
- identify a code based on the color gradient included in the area, wherein
- the color code includes a data portion in which a plurality of cells is arranged, each of the plurality of cells being assigned with the color gradient according to a value, the color gradient having a degree of hue which gradually changes in a predetermined direction within the each of the plurality of cells.

10. A code reading method, comprising:
- detecting an area having a predetermined shape from a captured image including a color code;
- extracting a characteristic pattern based on a color gradient of the color code included in the area;
- selecting the area in which the characteristic pattern matches a predetermined pattern; and
- identifying a code based on the color gradient included in the area, wherein
- the color code includes a data portion in which a plurality of cells is arranged, each of the plurality of cells being assigned with the color gradient according to a value, the color gradient having a degree of bue which gradually changes in a predetermined direction within the each of the plurality of cells.

\* \* \* \* \*